April 28, 1925.
W. A. DARRAH
METHOD OF MIXING DOUGH AND APPARATUS THEREFOR
Filed Aug. 20, 1921
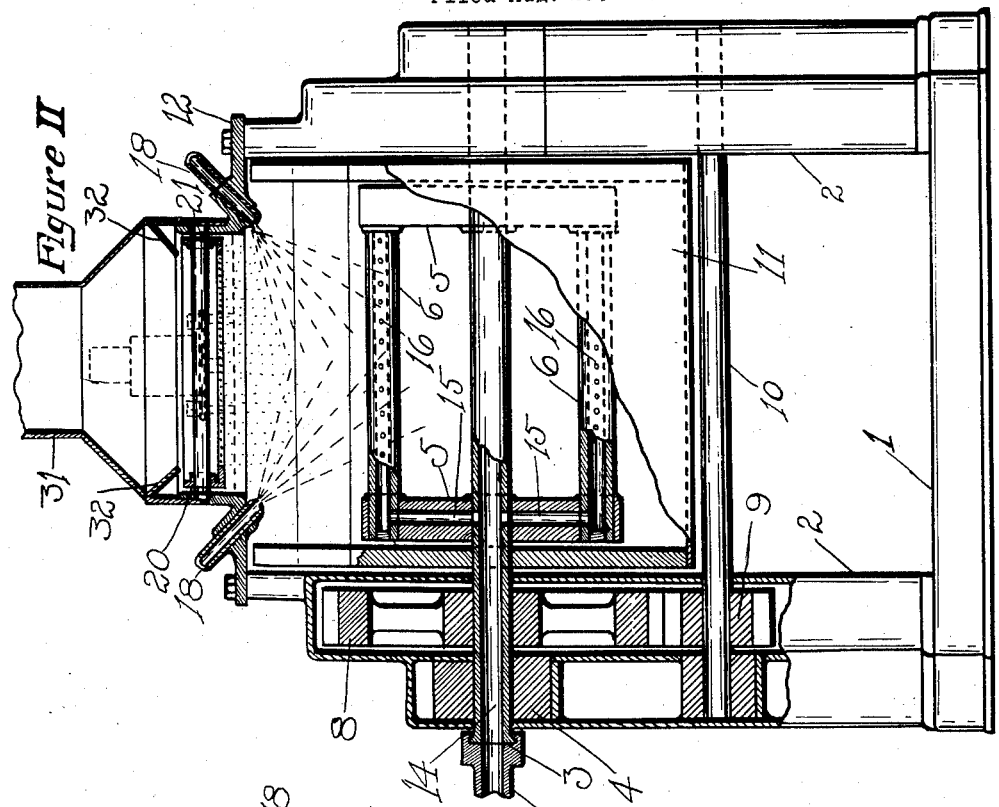
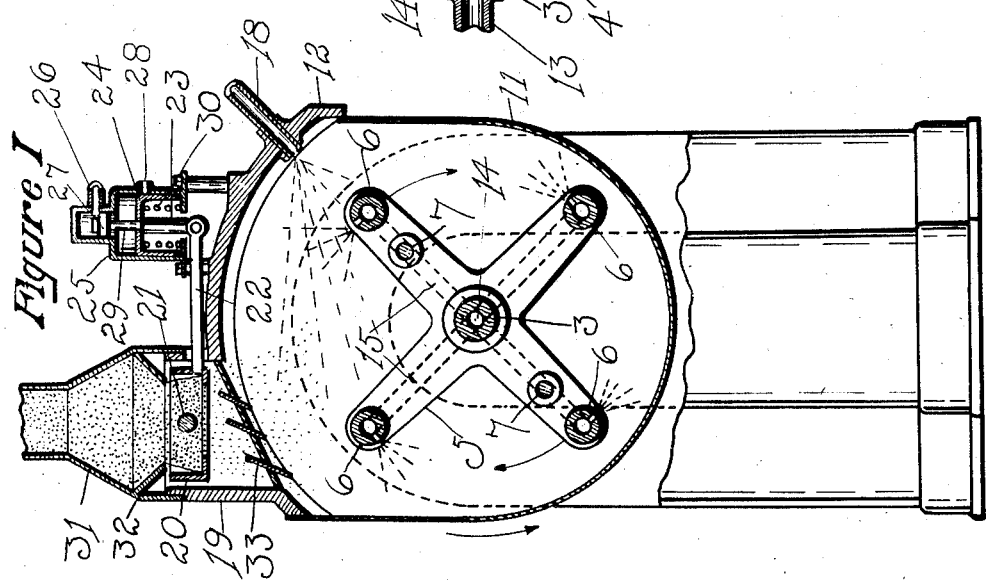
William A. Darrah,
Inventor.

Patented Apr. 28, 1925.

1,535,205

UNITED STATES PATENT OFFICE.

WILLIAM A. DARRAH, OF CHICAGO, ILLINOIS, ASSIGNOR TO THE EKCO ENGINEERING COMPANY, OF CHICAGO, ILLINOIS.

METHOD OF MIXING DOUGH AND APPARATUS THEREFOR.

Application filed August 20, 1921. Serial No. 493,873.

*To all whom it may concern:*

Be it known that I, WILLIAM A. DARRAH, a citizen of the United States, and a resident of Chicago, in the county of Cook and State of Illinois, have invented certain new and useful Improvements in Methods of Mixing Dough and Apparatus Therefor, of which the following is a specification.

This invention relates to methods of mixing doughs and the equipment used in carrying out this method. The doughs considered in this invention may be employed for the making of bread, cake, crackers and pastries of all kinds, as well as certain doughs used for other industrial purposes, as, for example, the manufacture of rubber, carbon products, etc.

Some of the objects of this invention are to provide a method which will be simple, positive, and substantially automatic, for thoroughly mixing various ingredients. This method and the equipment used in carrying out said method, are particularly applicable to the thorough mixing of the ingredients used in making doughs used in the baking industries. In the description which follows, I will use, for purposes of clearness, a description of this method and equipment as adapted to making doughs used in the manufacture of bread from wheat flour, although it should be understood that I do not wish to confine my invention to this field alone.

In the manufacture of dough for bread making purposes, it is common practice to not add more water than an amount about equal to 50% of the weight of the flour in the dough. Bakers refer to the amount of water added to a dough as the "absorption" of said dough, and an absorption of 50% on the basis outlined above, is common with the average baker. In a few instances this amount of absorption may be exceeded, and with certain equipment which is now available it has been even increased to 70%. Many efforts have been made to increase the amount of water in the dough, for the reason that the resulting bread is more palatable, more digestible, maintains its freshness longer, and is naturally less expensive to make by reason of the greater amount of moisture in each pound of product. On the other hand, most attempts to increase the amount of moisture in the average dough results in a dough which is so thin that it will frequently run or become pasty, and not only cannot be handled with the automatic machinery common to bakeries, but even refuses to rise satisfactorily.

I have found that when the moisture is thoroughly incorporated into the dough in such a manner that each particle of flour, no matter how small, has its full amount, it is possible then to increase the absorption to 70% and still make a dough which can be handled with reasonable ease by ordinary bakery machinery.

The fundamentals of securing a mixture of this kind involve a very perfect intermingling of the water, the flour, and the other ingredients in the dough, and only by this perfect intermingling can the desired amount of moisture be satisfactorily incorporated. In the case of dough, also, and other materials containing yeast or the equivalent, I have found that the amount of moisture is very greatly increased when the flour, water, yeast and other ingredients are intermingled in the presence of an abundance of fresh air or other gas. Incidentally, the said air or gas when introduced into the dough after having been previously cooled, is of material advantage in preventing over-heating of the dough.

In the method which forms the basis of this invention, I introduce the flour into the mixer through a screen, sieve, or equivalent apparatus, which separates the individual particles and causes them to enter in the form of an extremely fine dust. At the same time, I introduce the water in the form of an extremely finely divided spray, which preferably mixes with the flour and settles as the flour settles. Other ingredients, such as lard, sugar, milk, etc., may be forced in as a spray, or may in most practical instances merely be added in mass while the mixer is in operation.

Air, I have found, may most conveniently be introduced in the form of a number of small streams which escape from the arms of the beating element.

Having briefly described the method and principles of this invention, I will now illustrate one practical form in which it may be applied.

Referring to the drawing. Figure I shows an end elevation, partly in section, while Figure II shows a side elevation, also partly in section. In the drawings (1) represents a base, which may preferably be made of cast iron or steel. Two supporting castings (2) are erected at each end of base (1). Main shaft (3) is supported by bearings (4) carried by upright castings (2). Main shaft (3) carries a beater framework composed of spiders (5) and beater bars (6). The auxiliary beater bars (7) are also carried on spiders (5). Shaft (3) carries a drive gear (8) which meshes with a pinion (9) on countershaft (10). Said countershaft (10) may be caused to rotate by means of a motor, silent chain, belt, or any other mechanical equivalent, and as the driving mechanism forms no part of this invention it is not shown on the drawing.

A bowl or dough container (11) surrounds the rotating spider members, while a top (12) permanently supported by said frame members (2) serves as a dust-tight top for said bowl and a support for the mechanism above it.

A stuffing-box, (13) is connected to shaft (3) and serves to introduce cold air (or other desired gas) through the opening (14) in shaft (3). Opening (14) connects by means of channels (15) in spiders (5) with a channel or opening in beater bars (6). A series of small holes or perforations (16) connect the channels in beater bars (6) with the interior of the bowl and serve as the means by which the air which enters the stuffing box (13) finds its way into the dough.

The framework composed of the spiders (5), beater bars (6) and shaft (3), etc., should preferably revolve at a high speed. I have found that from 80 to 90 revolutions per minute gives satisfactory results, but do not wish to be restricted to these speeds alone.

Top (12) is provided with two spray inlets (18) connected to a source of cold water or other liquid which it is desired to incorporate into the dough. I have found it advantageous to employ cold water at 30 to 40 lbs. pressure and at a temperature of perhaps 40 degrees F. These spray nozzles (18) are arranged to direct the water in the form of a fan-like spray, through the path of the falling flour particles, thus insuring a thorough mixing. The dash lines fanning out from the spray nozzles represent, diagrammatically, one form of spray which is effective. The dotted lines fanning out from perforations (16) indicate diagrammatically the path of the cold air (or other gas) which is incorporated with the dough during mixing.

An extension (19) is mounted upon top (12) and houses a rapidly vibrating screen (20) arranged to pivot upon shaft (21). The screen is connected rigidly by link (22) to piston rod (23). Piston (24) in cylinder (25) is arranged to oscillate rapidly up and down in the influence of compresed air or other fluid entering through inlet (26) and controlled by valve (27). Outlet (28) indicates the means by which the air under pressure exhausts at the end of the stroke. Valve (27) is rigidly attached by rod (29) to piston (24). This is a simple slide valve arrangement, common in certain simple types of steam engines, and inasmuch as the exact construction of this vibrating mechanism is immaterial to this invention it will not be further described. It will suffice to say that the spring (30) serves to return piston (24) at the end of its stroke, and that the balance between the inertia of the vibrating screen, the kinetic energy of the spring, together with the force of the compressed air admitted intermittently, serve to keep the screen in continuous and violent vibration.

It should be understood that any common form of electrical, mechanical, or other vibrating means may be employed to equal advantage.

A hood or chute (31) is placed over screen (20) and provided with deflectors (32) to direct the entering flour into the screen.

The bottom of screen (20) may be covered with perforated metal wire gauze or equivalent material designed to allow the flour to pass through it but of sufficient fineness to secure considerable subdivision. The series of deflectors (33) are supported by top (12) beneath screen (20) in such a manner that dough, moisture, and other materials, when violently agitated by the beating mechanism, will not penetrate upward, and clog or otherwise affect the screen.

The arrows attached to the spider (5) indicate the normal direction of the rotation of the beater mechanism. In the same way the spiders outside of the mixing bowl and adjacent to it, indicate the direction of rotation of the mixing bowl when it is rotated for opening to remove the dough.

In operating this device it is desirable to place a weighed amount of flour in the cover or chute which is located above screen (20). The apparatus is then started in rotation and the shaking device is actuated. Cold water from a known measured source is then allowed to pass out through the spray nozzles in the form of a fine mist. The net result of all operations is an intimate and thorough mixture of flour, water and air which at first has about the consistency of cream, but on continued mixing gradually becomes thicker and thicker until it has the strength and consistency of dough. The various other ingredients may be added, as previously mentioned, either in mass or in the form of drops or sprays. As a rule no marked advantage results from adding the other ingredients in the form of a spray.

In operating this device I have found that a five barrel dough may be completely and satisfactorily mixed in a period not exceeding 15 minutes, although I do not wish to restrict myself to any particular time. Under these conditions the air should preferably have a temperature in the neighborhood of 32 degrees F., although this factor also is subject to variation.

Under the conditions here described, it is easily possible to produce doughs having good consistency and an absorption in excess of 70%. It should be understood that this absorption may be obtained with relatively low grade flour, which, in the hands of the ordinary bakers, with the ordinary baking equipment, do not admit of an absorption over 50 to 60 per cent.

Having now fully described my invention, what I claim as new and wish to secure by Letters Patent in the United States is as follows:

1. The process of making dough which consists in causing finely divided flour to fall with a mist of cold water into a dough mixer, and agitating the resultant product sufficiently to materially increase its temperature in the presence of a stream of cold air.

2. The process of making dough which consists in simultaneously screening the flour and spraying cold water into a dough mixer while agitating the mass thus formed by a beater system arranged to be cooled by cold air.

3. A dough mixer comprising a mixing bowl, a mechanically driven beater system revolvable therein, means for passing air into said dough through said beater system, means for spraying cold water into said dough, and a flour sifting device arranged adjacent to said mixer but operated independently of said mixer.

WILLIAM A. DARRAH.